Nov. 27, 1951    B. T. WRIGHT    2,576,327
AUTOMOBILE TOOL KIT
Filed Sept. 17, 1947    2 SHEETS—SHEET 1
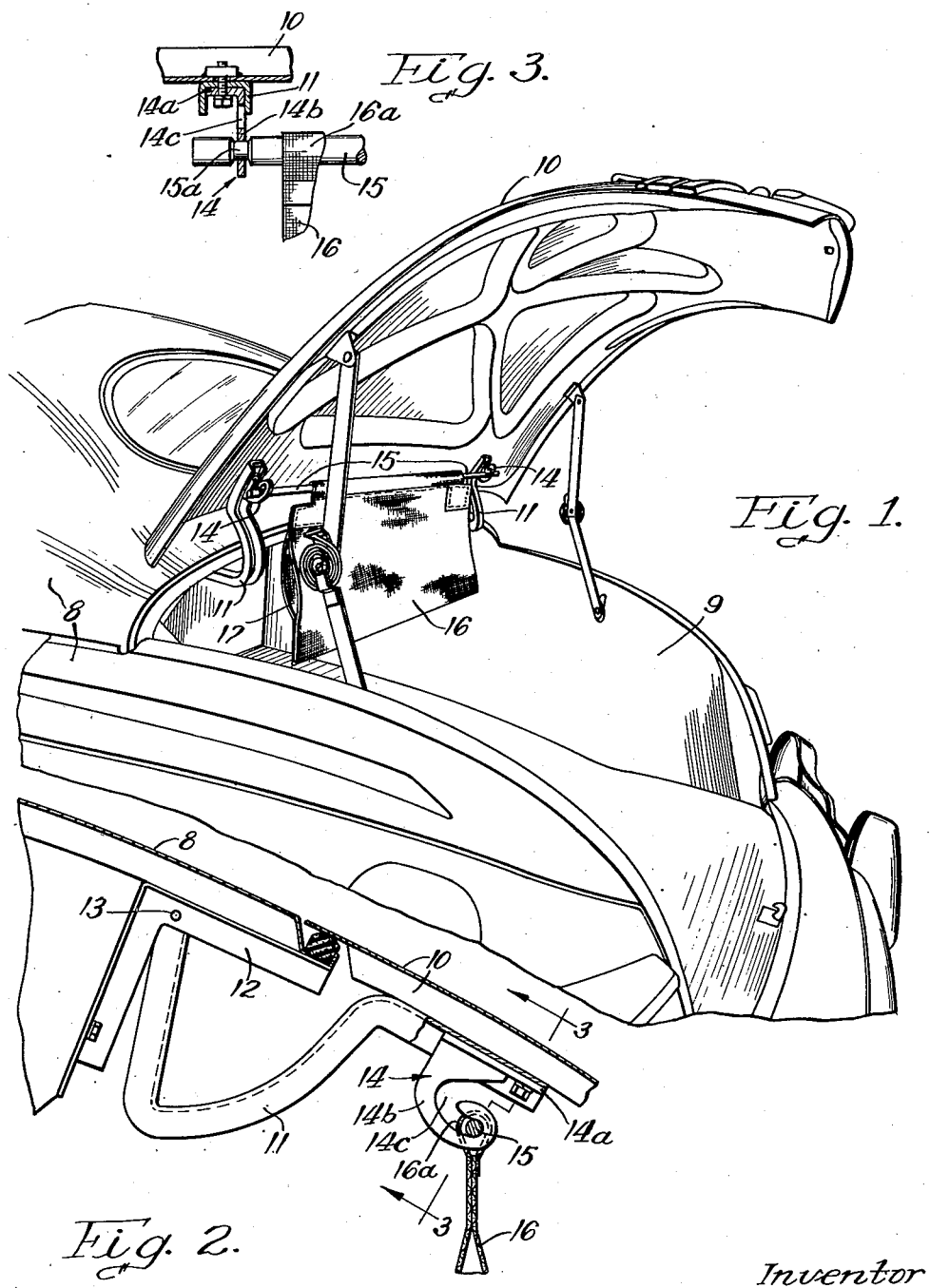
Inventor:
Benjamin T. Wright,
By Brown, Jackson, Boettcher & Dienner
Attys.

Nov. 27, 1951     B. T. WRIGHT     2,576,327
AUTOMOBILE TOOL KIT
Filed Sept. 17, 1947     2 SHEETS—SHEET 2
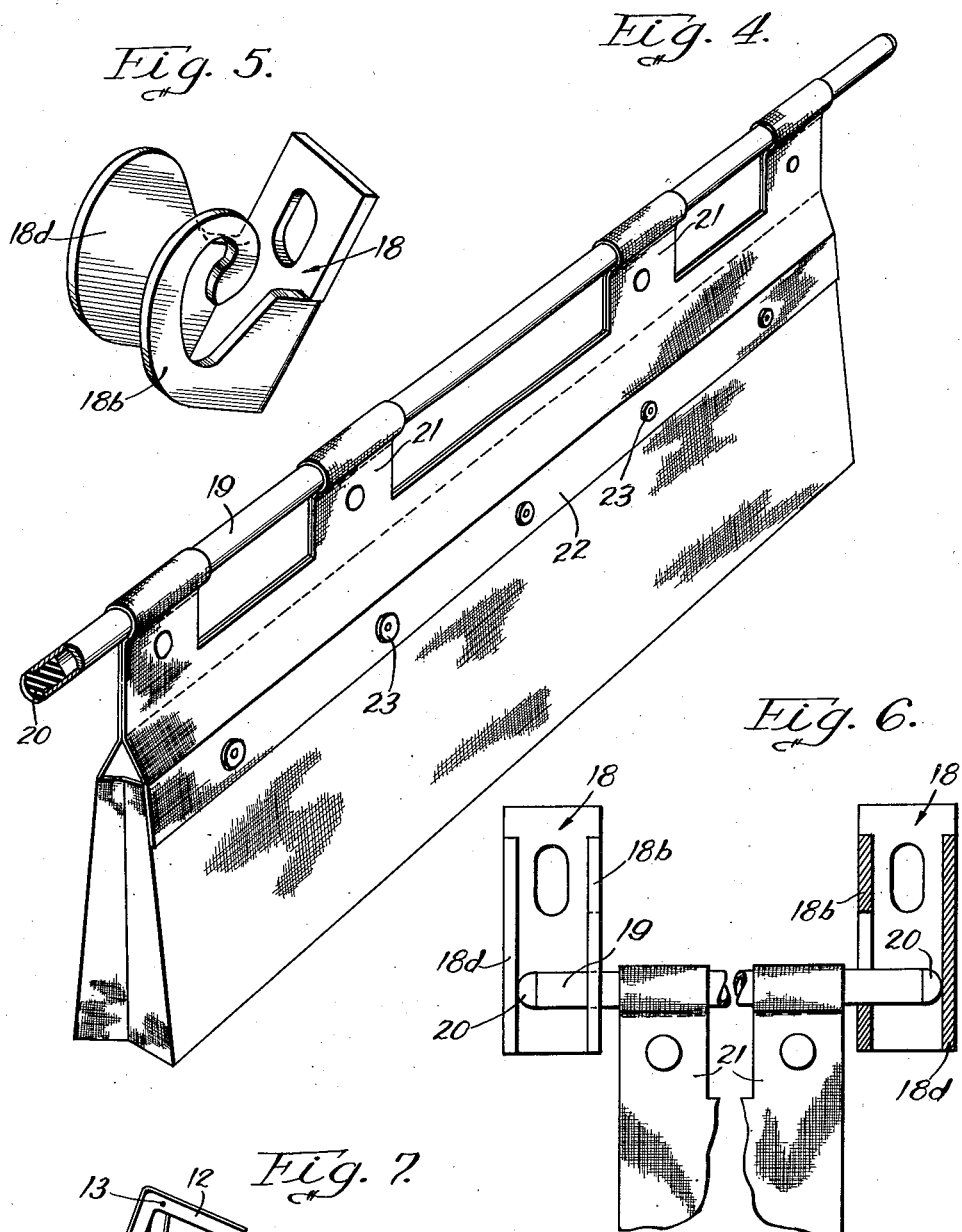

Patented Nov. 27, 1951

2,576,327

UNITED STATES PATENT OFFICE 2,576,327

AUTOMOBILE TOOL KIT

Benjamin T. Wright, Oak Park, Ill., assignor to Wright Motors, Inc., a corporation of Illinois Application September 17, 1947, Serial No. 774,627

3 Claims. (Cl. 224—42.45)

My invention relates to automobile tool kits, and has for its object the provision of such a kit and mounting means therefore so constructed and arranged that, though disposed in the luggage compartment at the rear of the automobile, the tools are made available readily and at once when the cover of the luggage compartment is lifted, whether or not the compartment is filled with luggage. It is a point of my invention that by its use the tools are not stowed in any part of the bottom of the compartment where water may collect.

It is a further object of my invention to provide a tool kit and mounting means therefor which can be applied universally to the various popular makes of automobiles, and, to this end, as will be seen, I suspend my tool kit from the hinges of the luggage compartment cover, and preferably from the movable members thereof, the container being in the form of a fabric bag to which access may be had while thus suspended or which may be removed entirely for opening on the ground or elsewhere.

My invention is illustrated in the accompanying drawings in which:

Figure 1 is a quarter perspective view of the rear of an automobile body with the luggage compartment cover raised, showing the tool kit in place;

Figure 2 is a side elevational view of the mounting means, on a larger scale;

Figure 3 is a fragmentary transverse view of the mounting means, taken on the plane of the line 3—3 of Figure 2;

Figure 4 is a perspective view of a modified form of container, showing the rod or tube upon which it is hung;

Figure 5 is a perspective view of one of the mounting brackets employed with the assembly shown in Figure 4;

Figure 6 is a developed view showing the assembly of the parts of Figures 4 and 5; and Figure 7 is a side elevational view of a modified form of support.

Referring, firstly, to Figures 1, 2 and 3—

Figure 1, as stated, illustrates the rear of an automobile body 8, having a luggage compartment 9, adapted to be closed by the cover 10.

The under side of the cover 10 is secured to the movable members 11, 11 of the cover hinges, the stationary members 12 of the hinges being secured to the inside of the body, as indicated in Figure 2, and the respective hinge members being joined by the pivot pins 13, 13 defining a transverse axis. As illustrated, the movable hinge members 11, 11 are of channel construction and are shaped to permit raising of the cover into the position shown in Figure 1. Luggage compartment cover hinges of this character are fairly standard in the popular makes of automobiles.

The free ends of the movable hinge members 11, 11 are conventionally bolted to the underside of the cover 10 and I utilize the bolts thus already provided to mount the brackets 14 in the ends of the channels as illustrated. Each bracket 14 is L-shaped, comprising a base 14a, fitting the channel and having an opening to receive the bolt, and an upright 14b, the latter having in it a hook-shaped open-ended slot 14c, best shown in Figure 2. The brackets are complementary and, thus, firmly mounted in the channel hinge members 11, 11, are in lateral alignment for the reception of a supporting rod 15 having near each end a circumferential groove 15a fitting in the hooked slot 14c in the respective bracket. Hung upon the rod 15, by way of a suitable hem 16a, is the fabric tool bag or container 16, access to which is had by way of an opening 17 at each end.

The hooked slots 14c in the uprights of the brackets 14 are so positioned that, when the compartment cover 10 is in its closed position, as shown in Figure 2, gravity holds the rod 15 in the dead ends of the slots, as illustrated. When the cover is raised to open position, as shown in Figure 1, the rod 15 automatically rides or rolls to the mid-portion of the slots, so that the rod, carrying the tool bag, may readily be lifted out of the slots and taken to wherever it is desired for use. The rod can readily be reinserted into the slots, and, when the cover is again closed, the rod will ride or roll back to the dead end position indicated in Figure 3 and will be retained there by gravity. If desired, tools may be removed from the bag, by way of the openings 17, without removing the supporting rods from the slots.

With the construction and arrangement above described, the tool kit will keep dry and will be readily available whether or not the luggage compartment is filled with luggage, thus obviating the necessity of removing luggage in order to gain access to the tools.

Referring now to Figures 4, 5 and 6—

It will be seen that here I make the brackets 18, corresponding to the brackets 14, U-shaped instead of L-shaped in cross section, one of the uprights 18b being the same as the uprights 14b of the members 14 and the other upright 18d functioning as a retaining member. In this instance, the rod 19, corresponding to the rod 15, is without grooves and is tubular, and rubber bumpers 20 are plugged into the ends, these bumpers engaging the retaining members 18d as indicated in Figure 6. Also, in this instance, the fabric tool bag is suspended by means of straps 21, 21, and is accessible from the top by opening the flap 22, normally held closed by snaps 23, 23.

In Figure 7 I illustrate a modification in which the uprights with the hooked slots are made integral with the movable members of the hinges, which form may be desirable for initial factory installation by the automobile manufacturer. The other forms, previously described, are particularly suited to installation by the automobile user.

I claim:

1. In combination with an automobile body having a luggage compartment with a cover mounted to the body by hinge members to swing on a horizontal axis, a supporting rod mounted on the hinge members distanced from the hinge axis, and a pendant tool container hung from said supporting rod.

2. In combination with an automobile body having a rear luggage compartment with a cover mounted to the body by a pair of hinges to swing on a horizontal axis, each of said hinges comprising a stationary member and a movable member, a bracket secured to the movable member of each hinge distanced from the hinge axis, a supporting rod carried by said brackets, and a pendant tool container hung from said supporting rod.

3. In combination with an automobile body having a rear luggage compartment with a cover hinged to the body on a transverse axis, a pair of laterally related complementary brackets secured to the under side of the cover distanced from said axis, said brackets having hook-shaped open-ended slots therein, the dead-end portions of said slots being substantially parallel to said cover, a supporting rod having a circumferential groove near each end engaging with a respective bracket slot, whereby said rod may ride in said slots toward the dead ends thereof when the cover is lowered and away from them when the cover is raised, and a pendant tool bag hung from said supporting rod.

BENJAMIN T. WRIGHT.

REFERENCES CITED

The following references are of record in the file of this patent:

UNITED STATES PATENTS

| Number | Name | Date |
|---|---|---|
| 1,392,092 | Thompson | Sept. 27, 1921 |
| 1,434,350 | Collins | Oct. 31, 1922 |
| 1,471,817 | Atkins | Oct. 23, 1923 |
| 2,483,478 | Smelker | Oct. 4, 1949 |

FOREIGN PATENTS

| Number | Country | Date |
|---|---|---|
| 19,476 | Denmark | Nov. 2, 1914 |